Patented Sept. 6, 1927.

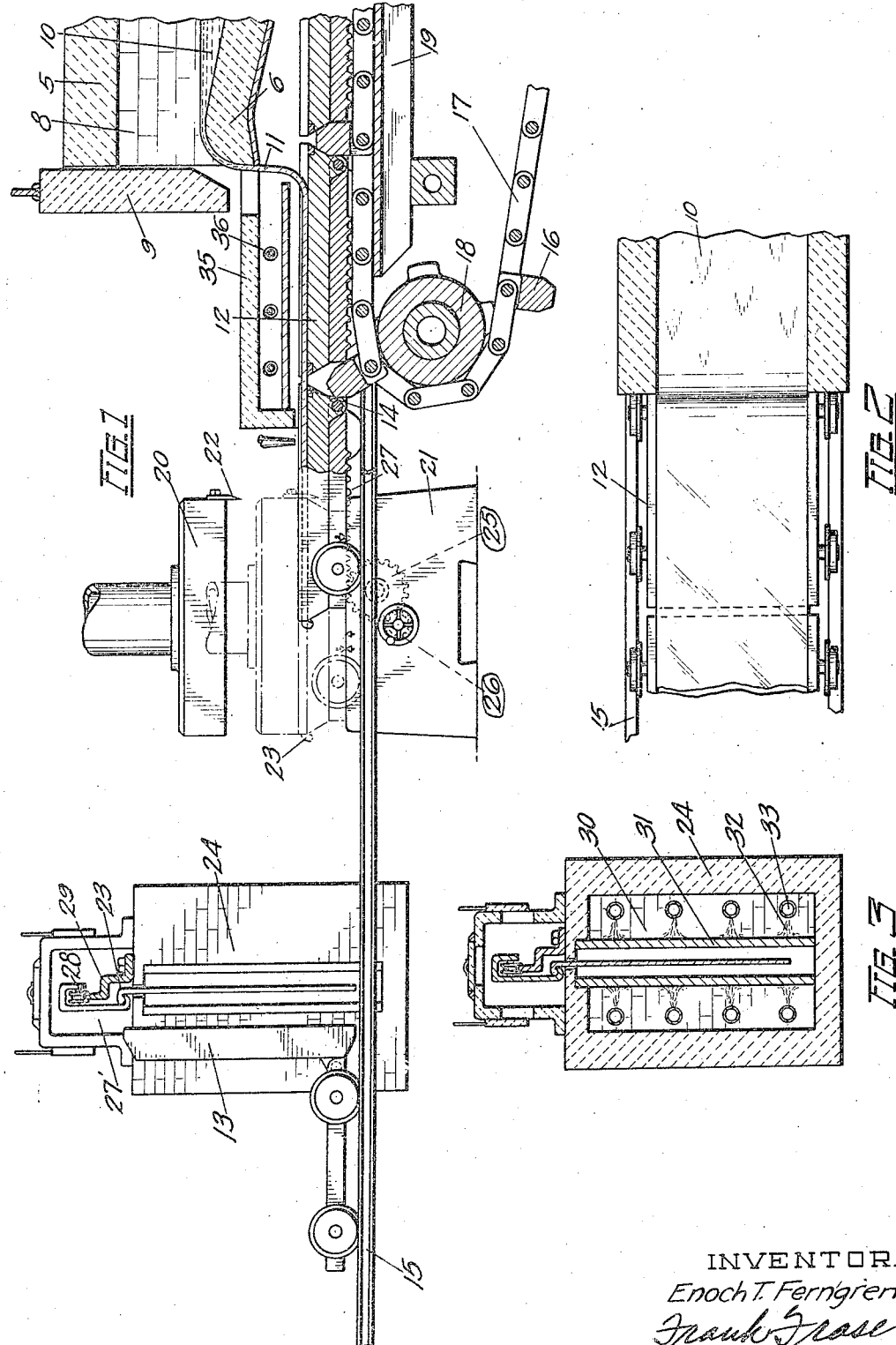

1,641,806

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

METHOD OF PRODUCING PRESSED SHEET GLASS.

Application filed November 24, 1924. Serial No. 751,820.

The present invention relates to a method of producing pressed sheet glass, and has particular reference to the manufacture of pressed glass suitable for plate glass use.

An important object of the invention is to provide means for continuously flowing a ribbon of plastic glass upon one of a plurality of molds in a manner wherein the ribbon can be separated into individual sheets which are capable of being pressed to a uniform thickness, after which the sheets can be suitably polished for plate glass use.

Another object is to keep the ribbon of glass in such fluent condition at points where it is separated into individual sheets that shears or cutters may be employed in the performance of the detachment of each individual sheet from the depositing ribbon.

It is also an object of this invention to immediately chill the upper surface of each sheet which is detached from the ribbon of glass to the end that this surface layer thereon will possess about the same degree of rigidity at the lower surface of the sheet, while the interior portion of the sheet is as yet in a plastic state.

A further object of the invention is to provide means of this nature wherein a quantity of glass is continuously overflowed in ribbon-like formation upon a movable mold and kept in a fluent state thereon, after which the glass is pressed to a uniform thickness and then fire-polished to give a sheet of glass suitable for plate glass uses.

Still another object of the invention is to form a sheet of glass by first flowing plastic glass in sheet formation upon a mold, pressing the glass thus deposited on the mold to a uniform thickness, and then placing the sheet in a vertical position and fire-polishing the same by preferably radiating heat.

Other objects and advantages of the invention will become apparent during the course of the following description.

In the drawings wherein like numerals are employed to designate like parts throughout the same—

Fig. 1 is a fragmentary longitudinal view, partly in section, through a portion of the apparatus, Fig. 2 is a fragmentary top plan of a portion of the apparatus, and Fig. 3 is a transverse vertical section through the fire-polishing chamber.

Heretofore plate glass has been formed by rolling a mass of molten glass upon a table, after which the blank thus formed has been ground and polished to give a sheet of glass suitable for plate glass use. Due to the irregularities and other surface deformities formed by the rolling process, it has heretofore been necessary to produce a blank substantially thicker than the thickness of the sheet desired, which has necessitated an expensive and tedious surfacing operation to give a sheet of the necessary dimensions.

In accordance with the present invention it is the aim to produce a sheet of plate glass much more quickly and cheaply than has heretofore been possible by substituting the grinding and polishing operations heretofore resorted to with a fire-polishing arrangement. This substitution is made possible by employing an apparatus such as is shown in the drawings.

In the drawings the numeral 5 designates the discharge end of a tank furnace, and has arranged at the bottom thereof a suitable refractory tile 6 having the curved end 7. The opening 8 of the discharge end is controlled by a shear cake 9. The molten glass 10 therein is continually overflowed to produce a ribbon 11 which is deposited upon one of a plurality of mold sections 12.

The mold 12 may be composed of nickel in its upper portion, or may be lined with a non-corrosive alloy to present a surface which may contact with the ribbon 11 without in any way permanently spoiling or injuring the glass surface. The mold 12 is pivotally carried upon a carriage 13 movable upon the rails 15. The molds 12 and carriage 13 are formed at their ends in a manner to permit a driving member 16 to be arranged between two adjacent molds to drive the same.

The speed of movement to be given to the series of molds and carriers by the driving members 16 depends on the nature of the glass, its temperature and fluency, and its quantity movement and speed or fall of sheet flow over the curve 7, which relationship when properly adjusted determines the subsequent thickness of the sheet.

As the sheet flow 11 contacts with the upper surface of each mold 12, which mold surface in normal practice should be preheated to a slightly noticeable tinge of red towards its edge portion, the contacting surface portion of the ribbon 11 receives more coooling along its median section, but in general is slightly chilled by the movement of heat therefrom into the body of the mold 12.

The loss of heat from the glass is however very slight as the heat movement balancing heat volume contained in each mold acts as a barrier to a rapid flow of heat from the depositing ribbon or sheet 11 and absorbs less heat therefrom where its contained heat is most easily or readily dissipated.

In order to prevent loss of heat from the glass at the point where it is to be severed, each driving member 16 is adapted to cause a spacing between the edges of the mold tables 12, by which arrangement the glass stream flowing from slab 6 is caused to bridge over the space between the molds and thus prevent it from coming in contact with any heat-absorbing media.

Each mold table 12 is provided with a knife or cut-off implement 14 which may be secured to the rear end thereof, and as the ribbon 11 is strung over the space between the molds 12 this implement 14 forms the extreme rear edge of table 12.

The driving members 16 are carried by a link chain 17 operable over suitable drums 18. The chain 17 rides in its upper draw upon the table 19. After the mold 12 has passed under the slab 6 and has a quantity of glass in sheet form deposited therein, it is advanced to and stopped at plunger member 20. Arranged directly below the plunger member 20 is a stationary support 21 to hold the mold 12 firmly during the pressing operation.

During movement of the glass ribbon 11 to the pressing station, heat should be applied thereover, and particularly along the edge section of the glass in order that a slightly higher degree of fluency sustaining temperature be maintained within the marginal body portions of the glass sheet or ribbon 11, for which purpose the heating enclosure 35 is located above the mold tables 12 and the burners 36 provided for the local heating of the edge portions of the glass sheet.

The plunger 20 is provided with a knife edge or cutter 22 which is mounted in position at the rear end thereof, and is adapted to cooperate with a knife edge 14 at the rear end of each mold 12, and to sever the ribbon 11 between adjacent molds prior to the pressing operation.

The actual operation to advance each mold 12 into position for the cutting and pressing of the glass ribbon may readily be performed automatically by the employment of suitable coordinated and synchronized mechanisms of well-known type, but as here shown these steps are performed and controlled partly manually.

As the gear rack 27 beneath each mold carrier 13 rides over the gear 25 during the forward movement of the carrier 13, the operator, by turning the hand-wheel 26, rotates the pinion 24 and gear 25 to drive the rack 27 and thus give additional forwarding impluse to each advancing carrier 13, by which the operator is enabled to pull each mold 12 forward into cutting and pressing position with just enough gradual acceleration in speed to slightly tension the glass ribbon 11 at the point where it is spanning the space between the molds, so that as the mold 12 is within a fraction of an inch from the pressing position and needs to be moved but slightly before being stopped, the maximum of stressing tension had in the stretched portion of ribbon 11, at which instant the knife 22 of the descending plunger 20 severs the glass sheet or ribbon 11 by a scissor-like cooperative movement with knife edge 14.

The actual pressing or stamping operation on each severed glass sheet must be unusually speedy, and of a fleeting duration unless the plunger 20 is highly heated when slightly more of pressure dwell may be allowed.

The reason for this is that the ribbon 11 as flowed, deposited and heat-treated, will be of nearly uniform thickness so that very little of glass displacement is required to get equal thickness, and that a quickly performed pressing or flat stamping action lessens the stresses in the contacted glass surface and in the as yet fluent glass body of the sheet, thereby somewhat permitting a slight readjusting movement of the glass after the flattening impact.

At the time the pressing action is performed the sheet body on mold 12 is less hot, but is still fluent so that much less of heat absorbing contact is required to give the required toughness and thickness of skin to the upper surface layer thereon.

When the mold is in position as indicated in dotted lines in Fig. 1, the plunger is shown at the instant of contact as the cutter member 22 severs the ribbon 11, while at the same time a glass flange 23 will be formed on the succeeding sheet section. The plunger 20 is pressed against the glass to give a sheet of uniform thickness, after which the mold and carriage are moved to a fire-polishing chamber 24. This is accomplished by means of the pinion and gear drive 25 operable by hand-wheel 26 which engages the rack-bar 27 carried by the carriage 14 on its lower surface. When the mold is in position in front of the fire-polishing chamber 24, it is tilted upon its carriage in a manner that the extension or flange 23 engages a hook 27 which is supported by means of a roller or rollers 28 on a track 29.

The sheet 30 is then conveyed through the fire-polishing chamber 24, which is preferably constructed to act upon the sheet by means of radiated heat. To accomplish this, arranged in the fire-polishing chamber 24 are two spaced preferably carborundum plates 31, against which play flames 32 from burners 33. The speed of the sheet through the fire-polishing chamber is controlled according to the amount of heat radiated through the carborundum plates 31. Due to the fact that the sheet is hung in a vertical position and that the flame does not actually come in contact with the sheet a perfectly flat, smooth and uniform sheet can be produced. If it is desired, the fire-polishing can be accomplished by a direct flame, but radiant heat will in most cases prove more satisfactory when making plate glass. After the sheet 30 has been fire-polished, it is then passed through an annealing leer to gradually cool the same.

From the foregoing it will be seen that the ribbon 11 is formed by an overflow of glass from a suitable source, which ribbon is of the approximate thickness of the desired size of sheet. After the ribbon has been placed upon the mold it is severed and then pressed to an absolute uniform thickness, after which it is fire-polished to give the desired finish. By means of the molds and track arrangement shown, it is possible to have a continuous method of producing plate glass blanks of uniform thickness. It is also desired that the lower face of the plunger 20, which, as shown, is purely diagrammatic, be lined or covered with a non-corrosive alloy.

It is also to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of producing sheet glass, consisting in flowing a quantity of glass into a mold, pressing the quantity of glass into sheet form, and then fire-polishing the same.

2. The process of producing sheet glass, consisting in flowing a quantity of plastic glass into a mold in sheet form, pressing the sheet to uniform thickness, and then fire-polishing the same.

3. The process of producing sheet glass, consisting in flowing a quantity of plastic glass into a mold in sheet form, pressing the sheet to uniform thickness, suspending the same in a vertical position, then fire-polishing said sheet.

4. The process of producing sheet glass, consisting in continuously flowing a ribbon of plastic glass into a plurality of molds, severing the ribbon between adjacent molds, pressing each piece thereof into a sheet of uniform thickness, and then fire-polishing the same.

5. The process of producing sheet glass, consisting in continuously flowing a ribbon of plastic glass into a plurality of molds, separating the ribbon with individual sheets, pressing each sheet to uniform thickness, fire-polishing the said sheet, and then annealing the same.

6. The process of producing sheet glass, consisting in continuously flowing a ribbon of plastic glass into one of a plurality of moving molds, severing the ribbon between adjacent molds, pressing each piece thereof into a sheet of uniform thickness, fire-polishing each sheet, and then annealing the same.

7. The process of producing sheet glass, consisting in flowing a quantity of glass into a mold in sheet form, pressing the sheet to a uniform thickness, and then fire-polishing the same by radiated heat.

8. The process of producing sheet glass, consisting in overflowing a source of glass in ribbon form upon a mold, pressing the same to a uniform thickness, and then fire-polishing the same.

9. The process of producing sheet glass, consisting in overflowing a source of glass in ribbon form upon a mold, pressing the same to a uniform thickness, and then fire-polishing the same with radiated heat.

10. The process of producing sheet glass, consisting in overflowing a source of glass in ribbon form upon a plurality of moving molds, severing the ribbon between adjacent molds, pressing each section to a uniform thickness, fire-polishing each piece, and then annealing the same.

11. The method of forming plate glass, consisting in flowing molten glass in ribbon formation upon a series of molds which are spaced from one another, in maintaining the fluency of the glass while it is received by each mold, in cutting the ribbon between the molds to form detached sections, in flattening each section as it is detached, and in applying heat to its surfaces to give polish thereto.

12. The method of forming sheet glass, which consists in flowing molten glass in ribbon formation upon a series of moving molds, in heating the edge portions of the molds and the edge sections of the ribbon, in heating the upper surface of the ribbon while it is received by each mold.

13. The method of forming sheet glass, which consists in flowing molten glass in ribbon formation upon a series of moving molds, in heating the edge portions of the molds and the edge sections of the ribbon, in heating the upper surface of the ribbon while it is received by each mold, in successively separating the ribbon into individual sheets while immediately pressing each sheet to uniform thickness.

14. The process of producing sheet glass, consisting in flowing a quantity of glass onto one of a plurality of molds, pressing the quantity of glass to sheet form with flat means and then polishing the same by radiated heat.

15. The process of producing sheet glass, consisting in flowing a quantity of glass onto one of a plurality of molds, pressing the quantity of glass into sheet form with means substantially the same size as the mold, and then fire-polishing the sheet.

16. The process of producing sheet glass, consisting in flowing a quantity of glass onto one of a plurality of molds, pressing the quantity of glass into sheet form with means substantially the same size as the mold, fire-polishing the sheet, and then annealing the same.

17. The process of producing sheet glass, consisting in flowing a quantity of glass into a mold, causing a localized heating of the edge portions of the glass, pressing the quantity of glass into sheet form, and then fire-polishing the same.

18. The process of producing sheet glass, consisting in flowing a quantity of glass into a mold, heating the upper surface of the glass and causing a localized heating of the edge portions thereof, pressing the quantity of glass into sheet form, and then fire-polishing the same.

19. The method of producing plate glass, consisting in flowing molten glass in ribbon formation upon a series of heated molds while subjecting the edge portions of the ribbon to a localized heat treatment.

20. The method of producing plate glass, consisting in flowing molten glass in ribbon formation upon a series of heated molds while subjecting the edge portions of the ribbon to a localized heat treatment, pressing the ribbon to a uniform thickness and then fire-polishing the same by radiated heat.

Signed at Toledo, in the county of Lucas, and State of Ohio, this 20th day of November, 1924.

ENOCH T. FERNGREN.